Nov. 1, 1966   N. A. J. BRATTBERG   3,282,544
TIGHT LEAD-THROUGH INLET FRAME DEVICE FOR ELECTRICAL LINES
Filed March 9, 1964   4 Sheets-Sheet 1

Nov. 1, 1966  N. A. J. BRATTBERG  3,282,544
TIGHT LEAD-THROUGH INLET FRAME DEVICE FOR ELECTRICAL LINES
Filed March 9, 1964  4 Sheets-Sheet 2

Nov. 1, 1966    N. A. J. BRATTBERG    3,282,544
TIGHT LEAD-THROUGH INLET FRAME DEVICE FOR ELECTRICAL LINES
Filed March 9, 1964    4 Sheets-Sheet 3

United States Patent Office 3,282,544
Patented Nov. 1, 1966

3,282,544
TIGHT LEAD-THROUGH INLET FRAME DEVICE
FOR ELECTRICAL LINES
Nils Arthur Johan Brattberg, Karlskrona, Sweden, assignor to A B Lyckeaborgs Bruk, Torskors, Sweden
Filed Mar. 9, 1964, Ser. No. 350,313
Claims priority, application Sweden, Mar. 11, 1963,
2,660/63
8 Claims. (Cl. 248—56)

Lead-through inlet frame devices for electrical lines such as single or multiple core cables, flexible leads and insulated or even uninsulated conductors are normally constructed for one single line only so that the number of inlet frame devices required is equal to the number of lines to be passed through the inlet frame devices. Particularly, if a plurality of lines has to be passed close to one another through a wall of any kind, considerable difficulties arise and render difficult mounting and demounting of the inlet frame devices and conductors. Such difficulties may be avoided to a large extent by inlet frame devices of the type shown in FIGS. 1 and 2 disclosing prior art, see for instance U.S. Patent No. 2,732,226.

The invention as well as the prior art is illustrated in the accompanying drawings in which.

Figure 1:
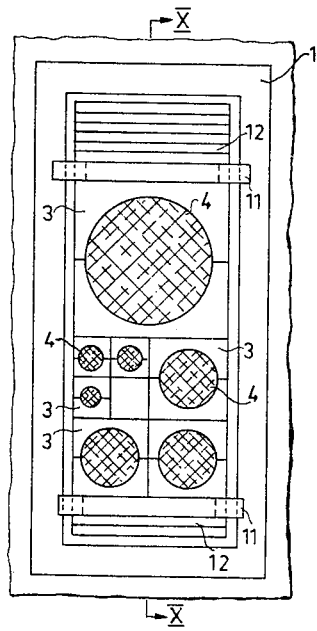
FIGS. 1 and 2 show the known inlet frame device as seen in the direction of the lines and transversely thereto respectively.
Figure 2:
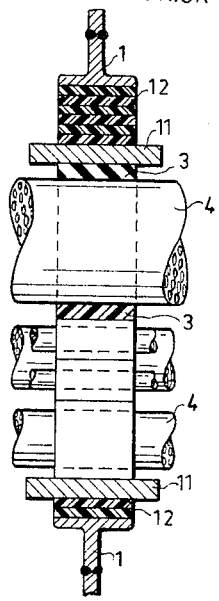

The known inlet frame device shown in FIGS. 1 and 2 comprises a metal frame 1, two clamping pressure plates 11 therein which are movable in one and the same direction in the plane of the frame, resilient clamping blocks 3 and resilient filling plates 12. For each individual line, a pair of blocks 3 is provided, every block having a semi-circular (semi-cylindrical) recess adapted to the diameter of the line to be clamped. One pair of such blocks 3 normally has a square cross-section or contour. Similar square or semi-square resilient blocks having no recess may be used as filling blocks within the area between the pressure plates 11. The sides of all blocks 3 to be inserted into the inlet frame device may be dimensioned in accordance with a modular system as may be seen by way of example from FIG. 1. The inlet frame device may be made tight and the lines may be clamped between the associated blocks 3 by pressing the two pressure plates 11 towards one another by means of an adjustable screw clamp or some similar device. By this procedure, spaces occur between the plates 11 and the adjacent sides of the frame 1 so that such spaces have to be filled with the resilient filling plates 12. Then, the pressure plates 11 are released so that a pressure equilibrium is obtained, and the pressure to which the blocks 3 and plates 12 are subjected in the direction of the centre line X—X will have an approximately uniform distribution so that all of said resilient elements are subjected to approximately one and the same unit pressure set up by their own resilience.

It is also known to use one pressure plate 11 only and to press this plate towards the blocks 3 by means of a screw which is approximately co-axial with the axis X—X and extends through a thread hole in one short side of the frame and engages the pressure plate. The spacing between the pressure plate and the associated short side of the frame has to be made tight by being filled with filling plates or bodies which, however, have to be pressed by separate special clamps or the like into tight contact with the walls of the spacing.

The above known construction as well as other similar constructions have disadvantages which are fairly troublesome in practice. A few only may be mentioned. In most cases practical difficulties arise with respect to the application of tools irrespectively of whether a clamp is used for the system shown in FIGS. 1 and 2 or a screw spanner is used for a pressure screw extending in the direction of axis X—X. It should be noted that such clamping has to be carried out when the lines 4 extend through the inlet frame device, and that the lines may be highly rigid and thick. The size and position of the area occupied by the resilient blocks and the lines is not predetermined and depends on the distance through which the pressure plate or plates 11 have been moved during the process of clamping. If the whole of the inlet frame device has to form a constructive unit to be mounted upon a wall, it may be difficult to ensure a fully tight circumferential contact and a satisfying contact pressure engagement everywhere around the rectangular lead-through aperture of the wall, more particularly in view of the indefinite final position of the pressure plate. Such and other disadvantages are still more cumbersome if, later on, one of the lines 4 has to be replaced, for example because it has been damaged or because a line of greater or smaller cross-sectional area has to be used. In limited spaces such as in airplanes or ships, air or pressure tight apparatus boxes, switch desks, distribution boxes, enclosed switchgears etc. where a great number of lines being relatively rigidly lain and fixed pass through the lead-through inlet frame device, said problems will prove difficult.

It is an object of the invention to eliminate a number of said disadvantages at least insofar as the construction of the inlet frame device can be varied such that either one part or another part of the disadvantages are removed.

Figure 3:
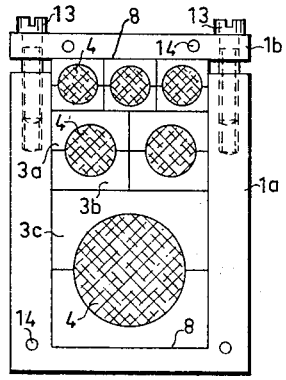
FIGS. 3 and 4 show an inlet frame device in accordance with the invention as seen in the direction of the lines and transversely thereto respectively.
Figure 4:
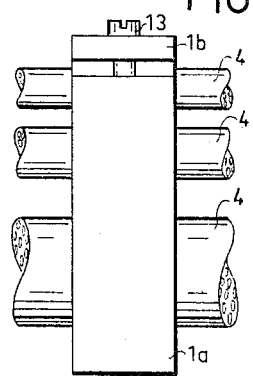

FIG. 3 is a view of a lead-through inlet frame device seen in the direction of the conductor lines 4 extending through the inlet frame device, and FIG. 4 is a side view of this inlet frame device. An inlet frame device comprises a U-shaped portion 1a and a yoke 1b which can be fixed to the two free ends of part 1a by means of two preferably hexagonal screws 13. The space or area enclosed by the frame forms the lead-through aperture or window and is filled with resilient, rectangular parallelepipedic clamping blocks 3a, 3b, 3c of various sizes. The blocks are preferably made of synthetic rubber but may alternatively consist of resilient plastic material, natural rubber or another suitable material. The clamping blocks are arranged in pairs such that the four outer sides of each pair of blocks, such as 3c, forms a square and that each individual block has a semi-square form, that is, the cross-sectional side ratio of each single block is 2:1. Each of the two blocks of a pair has a semicylindrical recess (semicircular in cross-section) such that the two recesses of the pair face one another and embrace an electrical line, such as a cable, having a diameter substantially equal to that of the two associated recesses embracing the conductor line. The sides of the blocks are dimensioned in accordance with a suitable modular system so that blocks adapted to conductor lines of different diameters can be joined such that the set of blocks to be provided in the above mentioned aperture of the frame forms a rectangle which approximately corresponds to the rectangular aperture but is larger than the aperture when the blocks are not compressed. Furthermore, semi-square or, preferably, square resilient blocks which have no recesses may be used to fill any empty areas of said rectangle which will not be used to contain electrical lines. For this object it is also possible to use rectangular filling blocks having a side ratio exceeding 2:1 but, nevertheless, in accordance with the modular system of the other blocks.

In the inlet shown in FIGS. 3 and 4 the set of blocks comprises clamping blocks 3a, 3b, 3c of different sizes for conductor lines of different diameters, respectively, the non-compressed relaxed set of blocks covering an area slightly exceeding that of the frame aperture such that the set of blocks shown in the non-compressed state projects beyond the free ends of the U-shaped frame part 1a. In a direction parallel to the yoke 1b and of the bottom portion of the U-shaped part 1a, the width of the block set should not, however, considerably exceed the width of the frame aperture to avoid the necessity of forcing the blocks into the space between the legs of part 1a under appreciable compression of the blocks 3. The thickest cable is embraced by the pair of blocks 3c, and the finest cables or leads are embraced each by a pair of blocks 3a. After having inserted the blocks and the lines therein into the frame 1a, 1b the compression screws 13 are tightened to press the yoke 1b towards and against the free ends of the two legs of the frame part 1a until the yoke is tightly abutting said ends or a gasket inserted between the yoke and said ends. Now, the inlet as a whole forms a constructional unit which is freely movable together with the lines passing therethrough and may be attached into or upon a wall which is provided with a lead-through aperture of similar size and form as the frame aperture limited by the frame parts 1a and 1b. In this compressed state, the inlet is impermeable to liquids and gases such as water and air which cannot pass through the inlet frame device in the direction of the electrical lines. Such inlet may readily be dimensioned such that it remains impervious even if the difference of the pressures on either side of the frame is considerable and say, of the order of many tens of lbs. (many atmospheres). Furthermore, it is not difficult to seal the joints existing between the inlet frame device and said wall so that liquid, or gas, cannot penetrate said joints, that is, cannot pass around the periphery of frame to the other side of it.

The frame 1a, 1b or flanges, projections or eyelets, etc. extending from the frame, may be provided with holes or bores 14 extending in the lead-through direction (direction of the electrical lines) so that the frame may be pressed and fixed to a wall by screws passing through the holes 14. As the final position of the yoke 1b, that is the position of the yoke when screwed tightly to the ends of the legs of part 1a, is definitely predetermined and unvariable, it is a simple measure to use a rectangular, frame-shaped plane packing or gasket of rubber or of any well-known sealing material between the frame 1a, 1b of the inlet frame device and the wall. The inner and outer peripheries of such seal may approximately coincide with those of the frame 1a, 1b. Sealing of the frame against or within a wall may be carried out in another manner. Thus, the block set itself may be used as a sealing means if all blocks at least slightly extend beyond the frame in the lead-through direction thereof with co-planar end surfaces of the blocks and if the aperture of the wall is slightly smaller than that of the frame. In such a case the four edge zones of the periphery of the block set may be pressed directly, for example by screws, against the edge zones of the aperture of the wall, and it is possible to use the same screws 14 for such sealing as for attaching the lead-through inlet frame device to the wall.

The two legs of the frame part 1a, and if desired, also the yoke or the bottom portion of this part, may be provided with set means such as guiding recesses for the elastic blocks so that two or three or all of the four edges (or pairs of edges) of the set of blocks are located in such recesses. Normally it is simpler and better, however, to use projecting flanges instead of guide recesses, for example such that the set of blocks as a whole cannot be displaced in the frame in the direction away from the wall but, if the set is not compressed can be displaced towards the wall.

Figure 5:
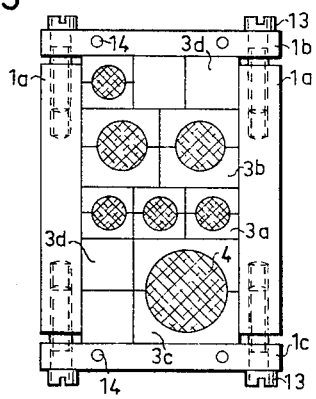
FIGS. 5 and 6 show another inlet frame device in accordance with the invention in the same manner as in FIGS. 3 and 4.
Figure 6:
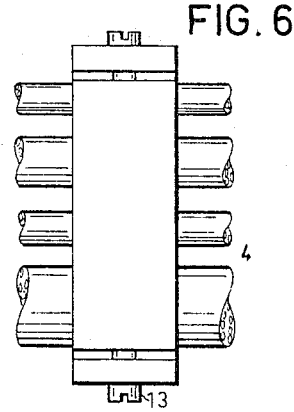

FIGS. 5 and 6 show a similar inlet as FIGS. 3 and 4, respectively with the exception that the frame is constituted by two parallel yokes 1b and 1c and two spaced separate legs 1a. The legs may be rigidly interconnected. One of the yokes, e.g. 1c, may be unvariably fixed to the legs 1a by screws so that the inlet frame device can be used in the same way as that described above and shown in FIGS. 3 and 4. If the set of blocks in its decompressed state extends in the direction of the legs 1a considerably beyond the ends of the legs, there is the danger that those blocks which are not guided by the legs will tend to expand laterally, when the set is compressed by the yoke 1b so that the lateral sides of the blocks will be clamped between the yoke 1b and the free ends of the legs 1a because the spacing or gap between yoke 1b and said ends is too large. In such a case, both of the yokes 1b and 1c may be released from the legs so that the width of the gap between each yoke and the associated leg end is halved. The use of two yokes has also the advantage that it is not necessary to produce a U-shaped frame part and that the length (height) of the set of blocks in the direction between the yokes may be chosen much greater than if one movable yoke is used.

It is possible to select types of plastic or rubber material such as certain neoprene rubber types, which during compression do not appreciably expand in a direction perpendicular to the direction of pressure.

Besides as may be seen from FIG. 5 lead-through areas may exist which are not required at all or which are provided as spare areas and, therefore, are filled with preferably square elastic blocks 3d not embracing an electrical line. All remaining elements of the inlet frame device shown in FIG. 5 may be similar to the corresponding elements in FIGS. 3 and 4 and may serve the same purpose.

Figure 7:
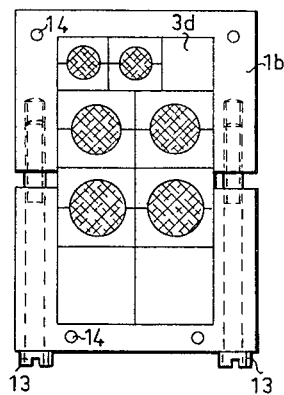
FIGS. 7 and 8 show a third inlet frame device in accordance with the invention in the same manner as in FIGS. 3 and 4.
Figure 8:
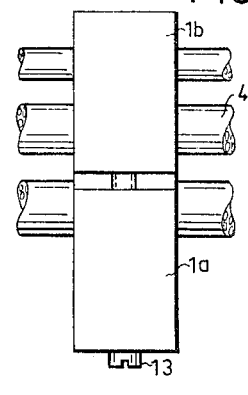

FIGS. 7 and 8 show a further lead-through inlet frame device differing from those described above substantially in that the frame is constituted by two U-shaped parts 1a and 1b the free ends of which oppose one another and may be pressed against one another by pressure screws 13. The frame parts are shown without other guides and set means than the screws 13. It is possible, of course, to provide guides of any type such as set pins, engaging longitudinal portions of the frame parts etc. ensuring that these two parts always remain aligned during and after compression of the set of blocks surrounded by the frame.

FIGS. 9–17 show lead-through inlet frame devices wherein the set of blocks are not compressed directly by means of a part (yoke) of the frame but are pressed against such part by means of a wedge system or similar system inserted into the frame. The system is made such that it is impermeable and subjected to an approximately uniformly distributed unit pressure as the set of blocks in the same way as the yoke referred to above. A uniform unit pressure means here that approximately one and the same local pressure prevails along an imagined line (8 in FIGS. 10 and 11) which is normal to the direction of pressure and to the lines 4 and extends in the lead-through plane (approximately the plane of the frame). Of course, the pressure need not be exactly one and the same everywhere and considerable deviations are quite acceptable, but nowhere should the pressure be concentrated to one single small area as is the case, in certain known devices where a pressure plate is pressed by a single screw against the set of blocks and the screw is supported by the yoke. Shortly, every discrete area of the yokes of the frame or frame parts corresponding to yoke, is subjected to a unit pressure which is substantially the same as that exerted upon said area by the associated opposite area of the block.

Figure 9:
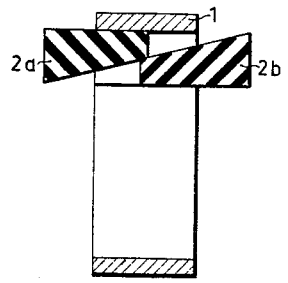
FIG. 9 is a schematic central section on the line I—I of FIG. 11 at right angles to the direction of the electrical lines and shows a decompressed inlet frame device.
Figure 10:
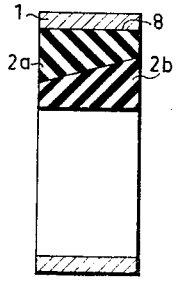
FIG. 10 shows the same inlet frame device as FIG. 9 in the compressed state.
Figure 11:
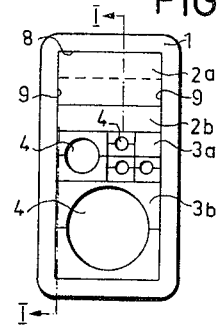
FIG. 11 is a front view of the inlet frame device shown in FIG. 10.

FIGS. 9–11 show a frame 1 and a wedge system comprising two free wedges 2a and 2b. FIG. 11 shows also square (or rectangular) elastic filling blocks 3a and elastic clamping blocks 3b having semi-circular (semi-cylindrical) recesses adapted to embrace and clamp cables 4 or other lines in the frame. It is assumed that the space below the wedge 2b in FIGS. 9 and 10 is filled with blocks 3a, 3b and lines 4. The manner of inserting the wedges into the frame may be seen from FIG. 9. FIG. 10 shows the wedges in their compressing end position such that they compress the set of blocks in the remaining aperture of the frame below the wedges. Thus, the aperture of the frame is entirely filled with blocks and wedges and is impervious to gas and liquid and may withstand a considerable pressure. FIG. 11 shows the inlet frame device seen from the left in FIG. 10 and in its final state ready for use.

Figure 12:
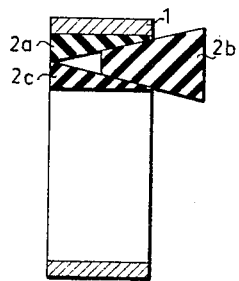
FIGS. 12 to 14 show another inlet frame device in the same manner as FIGS. 9–11.
Figure 13:
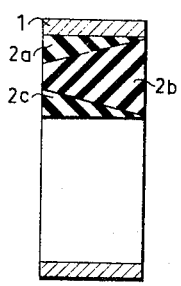
Figure 14:
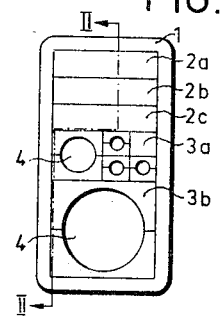

FIGS. 12–14 show another inlet frame device in the same manner as FIGS. 9–11 respectively, except that the wedge system includes three wedges 2a, 2b, 2c. The wedge 2a may be fixed to the frame or may be freely movable relatively to the frame. Preferably, the wedge 2c is laterally unmovable with respect to the frame shown in FIGS. 4 and 5 and is laterally unmovable as well as the two remaining wedges, with respect to the frame shown in FIG. 14.

Figure 15:
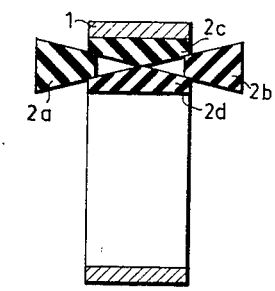
FIGS. 15–17 show still another inlet frame device in the same manner as FIGS. 9–11.
Figure 16:
Figure 17:
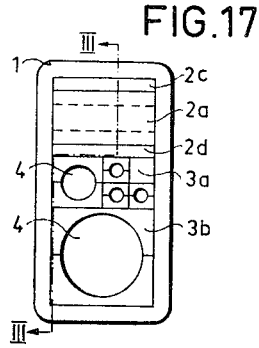

FIGS. 15–17 show an inlet frame device in the same way as FIGS. 9–11, respectively, the wedge system comprising four wedges 2a–2d. The individual wedges may be immovable in one or more directions as described with respect to FIGS. 12–14 and the same may apply to FIGS. 9–11.

In pressure-tight inlet frames devices it is not absolutely required but highly desirable that both each wedge per se and the wedge system as a whole are tightly pressed at least against one closed endless contour line or loop lying in one plane only. Small deviations such that the closed line or loop is not entirely plane and, thus, is slightly three-dimensional, are tolerable, however. The plane of such loop should preferably be substantially parallel to the plane of the frame so that the direction of the pressure produced by the wedges lies substantially within the plane of the loop. It should be noted, however, that this desirement or requirement does not involve that a sealing merely along one line of contact or loop would suffice but, considering all of those discrete areas of the surfaces 8 and 9 of the wedges which areas are tightly pressed against the inner sides of the frame and against the set of blocks and, as the case may be, against wedge sides 9 of an adjacent other wedge system in the frame, it must be possible to follow an imagined contour loop as defined above, which does not substantially deviate from a plane parallel to that of the frame, and particularly, such deviation must not be discontinuous such that the loop deviates at a right angle from the plane of the frame.

Considering as an example, the inlet frame device shown in FIGS. 9–11 the above desirement may be satisfied without difficulty, see FIG. 10, by using wedges which may be deformed so that their lateral sides 9 shown in FIG. 11 are tightly pressed against those parts of the frame which are shown vertical in the figure. If, however, only one of the wedges such as 2b is resilient whereas the other wedge 2a is rigid to such an extent that the lateral expansion (see FIG. 11) thereof, caused by the pressure of the wedges, is insufficient to result in tight pressure contact with the vertical sides of the frame, it is not possible to obtain a tight (impermeable) inlet frame device unless further measures are taken. In such a case the larger base of the resilient wedge 2b (that is, the right-hand surface of the wedge shown in FIGS. 9 and 10) has to be slightly higher than the vertical spacing between the set of blocks 3 in FIG. 11 and the upper yoke of the frame. The wedges 2a, 2b must be pressed together and, furthermore, the wedge 2b must be pressed to the left in FIG. 9 to such an extent that the end portion of wedge 2b which is adjacent to the larger base referred to above is pressed both against the sides of the frame and the cover thereof as shown in FIG. 11 and against the set of blocks. A sealing loop-line as defined in the preceding paragraph may then be followed along the whole wedge 2b. In many cases such a solution of the problem of sealing is less suitable, however, because either special clamping tools have to be used or fairly intricate manual operations may be required to produce a pressure at right angles to the plane of the frame to compress the wedge and to produce another pressure in the same direction to cause a relative displacement of the wedges 2a, 2b.

Thus the following description is substantially concerned with that case only, that at least two of the wedges are resilient. It is not necessary, however, that each wedge completely consists of resilient material only, provided that the wedge is made such that both wedge sides 9 tightly engage the frame.

When the set of blocks 3 and any intermediary layers (metal foils, strips etc.) in the free space below the wedge system or wedge systems are compressed by the wedges so that the pressure is increased during such procedure, the pressure will increase from a fairly low value to a high value and will be low during greater part (say 70%) of the movement caused by the pressure, whereas the pressure at the end of such movement may become high. For this reason, the wedge system may be such that the effective wedge surface and/or the apex angle of the wedge increases with the movement of the wedge, that is with increasing compression of the set of blocks. In the embodiments shown in the drawings, the effective surface of the wedges increases in the way just referred to. It is possible to form the wedges with curvilinear wedge surfaces such that the effective wedge angle is relatively great at the beginning of the compressing movement of the wedge and decreases continuously so that the ratio of the force exerted on the wedges and of the resultant compressing force produced by the wedges (the two forces being substantially perpendicular) steadily increases when the wedges are moved towards one another. Thus, the force transmission ratio of the wedge system increases with increasing compression of the set of blocks.

Figure 26:
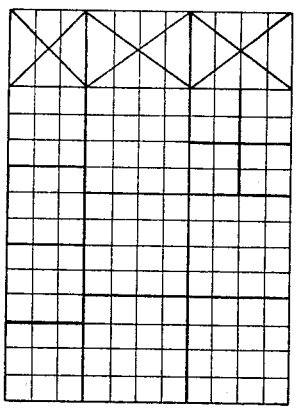
FIG. 26 is a schematic modular diagram of an inlet according to the invention.

FIG. 26 is a mere schematical view of an inlet frame device according to the invention wherein a modular system is used so that the sides of each minimum area in this figure is equal to a modular unit. The height of the aperture of the frame when closed (compressed condition) is 15 modular units including the wedge system and the width is 11 modular units. Each area provided with a diagonal cross represents one wedge system. Each square area surrounded by a thick line represents either a square filling block having no hole or a pair of clamping blocks which together embrace a line 4. Said square areas have different side lengths each being equal to 2 or 3 or 4 modular units in FIG. 26, but the length may also be equal to 6, 9 or 12 or even more units. A filling block may have another form than a square and each clamping block may have another form than a half square but the square form, or semi-square form respectively, generally is advantageous because it permits a minimum number of different sizes of blocks.

Though less desirable in some cases, it may sometimes be advantageous to arrange bigger blocks such that two adjacent wedge systems compress individual areas of one and the same block.

The three wedge systems shown in FIG. 26 as well as their wedges have a width (horizontal dimension in the plane of the drawing) equal to 3 or 4 modular units. Obviously, a small number of sizes of blocks and wedge systems are sufficient to permit a very great number of different combinations of line numbers and line areas in an inlet according to the invention and, of course, the number of different wedge system sizes and block sizes may exceed two and four, respectively.

The two wedge systems according to FIGS. 18–25 are made on the basis of the principle disclosed by FIGS. 15 and 16 and are gas-tight. Each wedge system comprises two wedges 2a and 2b being relatively movable in their longitudinal direction and two further wedges 2c and 2d being relatively movable in a direction normal to said longitudinal direction. Preferably, none of the four wedges is fixed to the frame 1 (FIGS. 9–17) so that the wedge system as a whole readily can be inserted into the frame and removed from it. The wedge 2c may however, be provided with well known means (not shown) such as set pins, stops or the like to prevent unintentional displacement of the wedge and, thus, of the wedge system in a direction perpendicular to the plane of the frame.

Figure 19:
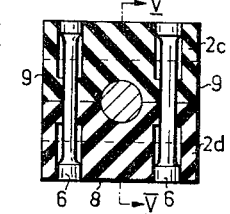
FIG. 19 is a cross-section of the system along the line I—I in FIG. 18.
Figure 23:
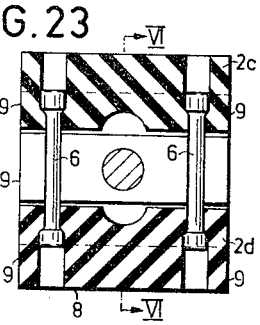
FIG. 23 is a section on the line III—III of FIG. 22.
Figure 20:
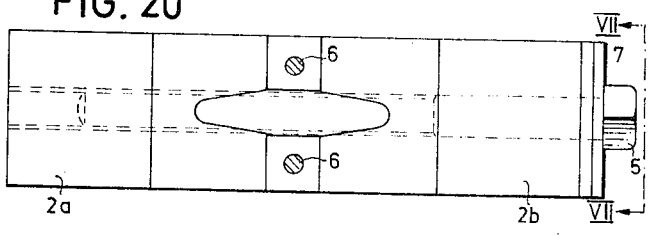
FIG. 20 is a longitudinal section of the wedge system along the line II—II in FIG. 18.

The two wedges 2a and 2b are preferably identical, and similarly also the wedges 2c and 2d may be identical. The two wedges 2c, 2d are movably interconnected by two pins 6 the two ends of each pin 6 being provided with a head or another projection so that the movement of the two wedges 2c, 2d is limited and is restricted to the direction of compression of the set of blocks to be compressed by the wedge system shown. The pins 6 rest in bores having collars the diameter of which exceeds that of the bores so that the two wedges 2c, 2d cannot be unintentionally separated. The angularly bent surfaces of the opposite parts of the two wedges 2c, 2d are recessed, the recesses being straight and semi-cylindrical to form between them a bore even if the two wedges are pressed against each other. A compression screw 5 extends through this bore and also through coaxial bores in the two first-mentioned wedges 2a, 2b the bore of wedge 2a being threaded. The bore of wedge 2b is smooth and has a diameter slightly exceeding both the diameter of the screw neck and the outer diameter of the thread of the screw 5. Alternatively, the bore of wedge 2b may be threaded (not shown) for engagement with the thread of the screw 5, and the unthreaded neck of the screw should then have a diameter less than that of the inner minimum diameter of the thread of the bore of wedge 2b, so that the screw 5 cannot be lost from the wedge 2b but may engage the thread of the bore of wedge 2b in a manner known per se. In FIGS. 19 and 23 the compression screw 5 is not shown to render visible the threaded holes of the wedges.

In the last mentioned case and also if the two wedges 2a, 2b consist of the same resilient material, the wedges may be exactly identical in form and material and thus, interchangeable. In such case also wedge 2a must be provided with straight recesses to receive the ridge 7 mentioned below.

If the wedge 2a is made of resilient material, in most cases, depending on the type and characteristics of the material of the wedges, the wedge should not have an inner thread directly cut or pressed into the material. The wedge should, then, be provided with a threaded bushing (not shown). Such bushing of metal may be fixed to the elastic material of the wedge in any known way. For example natural and synthetic rubber may be vulcanized directly onto the bushing.

Figure 22:
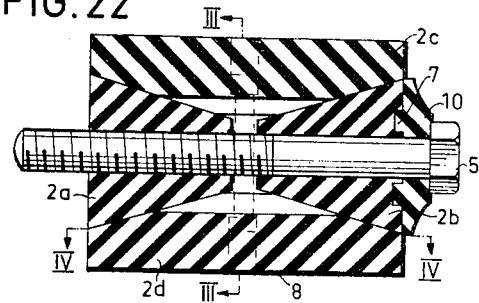
FIG. 22 is a longitudinal section on the line VI—VI of FIG. 23 of another wedge system in the compressed state and being wider than the wedge system shown in FIGS. 18–21.
Figure 22A:
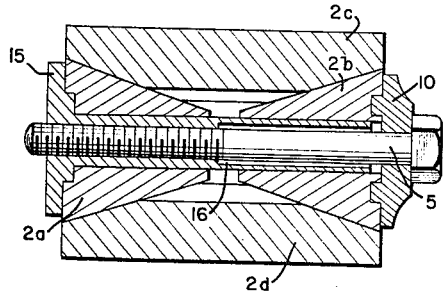
FIG. 22A is a longitudinal section of a modification of the wedge system shown in FIGS. 22–25.

As shown in FIG. 22A, the wedge 2a may be engaged by a nut element 15 integral with an internally threaded bushing 16 and in contact with the larger base surface of this wedge, which is the left base surface in FIG. 22A. The two wedges 2a and 2b are identical and, thus, interchangeable. Each of the two wedges 2a, 2b has an unthreaded bore of greater diameter than that of the screw 5. The bushing 16 may be so long, as shown, that it extends into the right-hand wedge 2b and is longitudinally movable therein, so that the screw 5 may be fairly short and is well protected. If desired, the nut 15 and bushing 16 may be separate elements in which case the bushing 16 should not be threaded, however. All details may readily be dimensioned such that the screw cannot be tightened more than until it abuts the bushing so that it is impossible to tighten the wedges more than by a predetermined tolerable amount of force.

Figure 18:
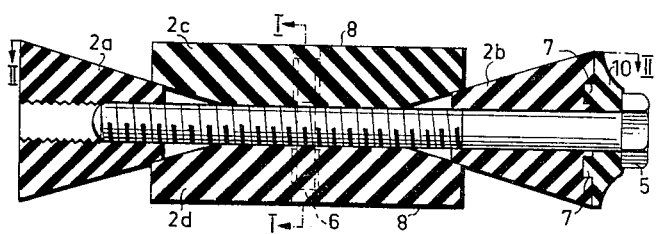
FIG. 18 is a longitudinal (axial) section along the direction of the electrical lines taken on the line V—V of FIG. 19, of an expanded wedge system to be used in inlet frame devices according to the invention.

It may be seen directly from FIGS. 18 and 22 that each of the two shown wedge systems forms a single though readily dismountable unit which as a whole may be put into and removed from the frame 1 such as that shown of any of the FIGS. 9–17. Thus, no loose screws, loose wedges, etc. are required and no adjustment of the elements to the correct position is required when inserting the unit into the frame.

Even if the inlet has to be absolutely tight and should remain so even if some gas or liquid pressure is applied, the wedge 2a may consist of metal and need not, then, contain the threaded bushing described above, nor an elastic cover. For the sake of simplicity, however, it may normally be advisable to use wedges of one and the same material, that is, resilient material, and to use identical wedges 2a and 2b, one or more of the wedges or even all of them may be made, however, of solid or hollow metal or hard thermo-setting plastic material, wood, or the like if they are covered with a resilient or plastic layer upon their sides 8, 9 facing the inner wall of the frame 1. Such layer may consist of a soft rubber sheet, a tough filling paste or compound or the like if the play or clearance between the frame and the wedges is very small only and tolerances are good. It may even suffice to use a viscous oil or lubrication grease. Such precision inlets may be more expensive but are, nevertheless, useful in a number of special cases such as for inlets which must be frequently dismounted or may be subjected to radioactive radiation or radioactive substances etc. In such cases, wedges and even the blocks may be made of or filled with alloyed lead.

After having inserted the desired cables etc. and the required blocks (and inserts, if desired) into the frame, one or more wedge systems are inserted in a remaining space between rows of blocks or between the set of blocks and the frame, for example according to the modular system shown in FIG. 26. The wedge systems are inserted in their non-compressed condition shown, for example in FIG. 18 preferably such that one of the two surfaces 8 (FIGS. 18, 19, 22 and 23) are in contact with the frame 1 shown in FIG. 15 whereas the other surface 8 is in contact with the set of blocks. If more than one wedge system is used, each should be inserted such that the heads of all of the screws 5 are located on one and the same side of the plane of the frame. If only one side of the frame is accessible after having mounted the frame on the wall, the heads of the screws 5, of course, must be located on this side.

Figure 21:
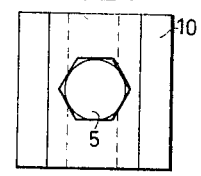
FIG. 21 shows the wedge system as seen on the line VII—VII of FIG. 20 in the direction of the arrows.
Figure 24:
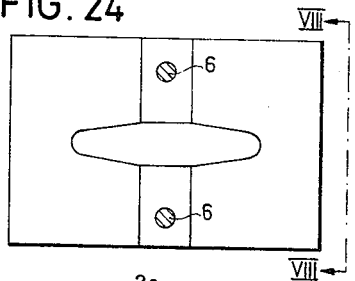
FIG. 24 is a section on the line IV—IV of FIG. 22.
Figure 25:
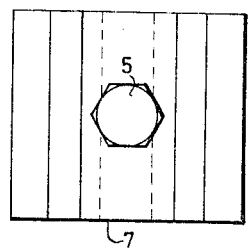
FIG. 25 shows a system as seen on the line VIII—VIII of FIG. 24.

The screws 5 are rotated so that two wedges 2a, 2b are moving towards each other and are forced in between the two remaining wedges 2c and 2d and press them apart. At one of the two latter wedges, viz. wedge 2c, is supported by the frame, the other one 2d compresses the set of blocks in the frame. As the compression screw or screws 5 are tightened and the compression of the set of blocks increases, also the force required for further compression of the blocks increases so that all resilient elements are compressed in the direction of the pressure and slightly expand laterally and thus, everywhere are tightly pressed against all adjacent elements (blocks, wedges, frame parts, any inserts, etc). A rectangular washer 10 is provided with straight ridges 7 which engage straight grooves in the wedge 2b, so that the washer cannot be rotated when rotating the screws. FIG. 21 shows the wedges in the state of compression which corresponds almost or entirely to the extreme position of these wedges. It is not necessary however, to dimension the elements of the inlet such that the wedges have to be tightened to such extreme positions to achieve a perfect sealing. Some margin should remain so that, after some time, the screws 5 may be further tightened to compensate for any setting of the set of blocks which setting may be owing to mechanical hysteresis of the resilient material or owing to vibrations etc. By said lateral expansion of the resilient material of the wedges the sides 9 of the wedges are pressed against the frame and against the facing side 9 of the adjacent wedge system.

The wedge system or systems may be provided within the set of blocks so that the set is subdivided into two parts engaging the two sides 8 of the wedge system, each to each. Such arrangement is advantageous, for example, if the lines 5 consist of fairly rigid cables curved to opposite directions in the vicinity of the frame so that the cables form two groups, one being curved upwards in FIGS. 9–17 and the other being curved downwards. In this case the wedge system should be located between the two groups of cables to be readily accessible.

By appropriate selection of the material of the wedges dimensioning thereof and of the angles and curvature of their surfaces, and furthermore by proper selection of the relative and absolute play tolerances between the engaging wedge surfaces and between the other wedge surfaces and opposing surfaces of the frame etc., the specific sealing pressure of all wedge surfaces 8 and 9 may be made approximately equal. As the friction coefficient between surfaces of the resilient material normally will be considerably different from that between a frame surface and a wedge surface of resilient material, internal mechanical tensions or even undesired deformations may occur in the wedges as a result of the compressing of the set of blocks. Such tensions may be avoided or at least considerably reduced by proper selection of the above parameters and/or by using a suitable lubricant such as oil, grease, graphite, water, glycerine, silicone lubricate etc. and/or by using layers of a material altering the friction between said surfaces.

For example, if the wedges consist of rubber, the whole wedge system may be simply submerged in water or glycerine before being inserted into the frame.

The frame 1 in FIGS. 18–25 may form part of the wall into or onto which the inlet according to the invention is to be mounted. Alternatively, the frame may be produced on the same place of work where the inlet has to be used. The frame may simply consist of a rectangular aperture in the wall or may be used as a supporting or stiffening part of the wall. If, for example, the wall consists of concrete, an aperture of suitable dimensions and little tolerance only may be formed in the concrete so that the blocks and wedge systems may be put directly into said aperture of the wall. If the frame is formed by an aperture in concrete, the inner surfaces of the apertures should be smooth either by providing the concrete itself with a smooth surface in a way well known to the man of art or by providing the surface with a smooth layer or with a sheet or strips of suitable material. The surface may be puttied. Such smoothing procedure may be carried out such that any pores, fissures or similar leakage paths in the wall are sealed. In any wedge system inserted between a side (yoke) of the frame and the set of blocks, the wedge facing and engaging said side of the frame may be fixed to or integral with said side.

What is claimed is:

1. A device for mounting around a plurality of electrical lines to support the latter relative to a wall on or in which the device is adopted to be mounted, said device comprising a rectangular frame whose aperture is partly filled with a modular set of rectangular-section parallelepipedal blocks four of whose plane faces are parallel to the sides of the frame, which blocks are at least partly resilient and a plurality of which are divided centrally intermediate two of said plane parallel faces with mutually-complementary semi-cylindrical recesses in the juxtaposed surfaces of each of the divided blocks for through passage of an electrical line, at least one wedge system extending across the full width of the aperture, said wedges in the absence of pressure having a rectangular cross-section in the plane of the frame and being movable in this plane relative to one another for exerting a uniform and constant compressive force on said blocks across the full width and length of said aperture and in the direction in the plane of said aperture and normal to the planes of the block divisions to compress the filling of the frame and to clamp through passing electrical lines, said frame blocks and wedges being a unit which is attachable to and detachable from a wall.

2. A device as claimed in claim 1 wherein each wedge system is provided with assembling means holding together the wedges and all other elements of the wedge system which as a whole can be inserted into and removed from the frame.

3. A device as claimed in claim 2 provided with a plurality of wedge systems located side by side in the frame to form a row which is perpendicular to the plane of the frame so that the wedge systems are adapted to compress associated individual zones of the set of blocks.

4. A device as claimed in claim 3 wherein each wedge system comprises a pair of first wedges which in a direction normal to the plane of the frame are movable relative to each other, and a pair of second wedges which in the direction of pressure in the plane of the frame are movable relative to one another, the last-mentioned two directions being substantially at right angles to each other.

5. A device as claimed in claim 4 wherein the two first wedges are interconnected but relatively movable by a screw engaging a thread in one of said first wedges, said screw extending through the other first wedge without engaging a thread therein, and wherein the through-hole of the last mentioned wedge has a diameter slightly exceeding the major diameter of the screw thread and is provided with a corresponding inner thread, the diameter of the neck portion of the screw is less than the minor diameter of the thread.

6. A device as claimed in claim 5 wherein a washer is provided between the head of the screw and said other first wedge and is secured against rotation relative to the wedge but is rotatable relative to the screw, the washer being rectangular and covering approximately the entire wedge surface facing the screw head.

7. A device as claimed in claim 6, wherein said second wedges are interconnected such that their movement relative to each other is limited and the pair of second wedges cannot fall apart.

8. A device as claimed in claim 7 wherein each wedge system forms a unit which cannot fall to pieces, said screw extending through the gap between the two second wedges which are provided with recesses for the screw which extends at a right angle to both the plane of the frame and the direction of relative movement of the two second wedges, the two first wedges being provided on either side of the two second wedges which are interconnected by one or more pins, these pins being movable with respect to at least one of the two second wedges and permitting said limited relative movement of the second wedges.

References Cited by the Examiner

UNITED STATES PATENTS

| | | | |
|---|---|---|---|
| 2,227,528 | 1/1941 | Adler | 174—135 |
| 2,732,226 | 1/1956 | Brattberg | 285—192 |

FOREIGN PATENTS

| | | |
|---|---|---|
| 538,730 | 8/1941 | Great Britain. |
| 544,618 | 4/1942 | Great Britain. |

CLAUDE A. LE ROY, *Primary Examiner.*